United States Patent [19]

Prenn

[11] Patent Number: 5,305,493
[45] Date of Patent: Apr. 26, 1994

[54] PNEUMATIC DEVICE FOR CLEANING AIR FILTERS

[75] Inventor: Josef Prenn, Campo Tures, Italy
[73] Assignee: Nuova Camp S.r.l., Turin, Italy
[21] Appl. No.: 858,772
[22] Filed: Mar. 27, 1992
[30] Foreign Application Priority Data
  Mar. 29, 1991 [IT] Italy ................. BZ91000010
[51] Int. Cl.$^5$ ............................. B08B 5/04
[52] U.S. Cl. ........................ 15/304; 15/345
[58] Field of Search .......... 15/345, 346, 304

[56] References Cited

U.S. PATENT DOCUMENTS

| 2,242,901 | 5/1941 | Birch | 15/304 X |
| 3,538,926 | 11/1970 | Nesbitt | 15/304 X |
| 3,733,639 | 5/1973 | Timian | 15/304 X |
| 3,765,051 | 10/1973 | Wanat | 15/304 X |
| 3,936,902 | 2/1976 | Shackleton et al. | 15/304 |
| 3,978,547 | 9/1976 | Lawson | 15/345 |
| 4,670,062 | 6/1987 | Lester | 15/345 X |
| 4,808,234 | 2/1989 | McKay et al. | 15/345 X |

FOREIGN PATENT DOCUMENTS 2936779 4/1981 Fed. Rep. of Germany ........ 15/345

Primary Examiner—Chris K. Moore
Attorney, Agent, or Firm—Fiddler & Levine

[57] ABSTRACT

Pneumatic device for cleaning air filters, and industrial filters in general, particularly filters mounted on endothermic engines such as motor vehicle engines, comprising a casing 1, provided with a water tight door 1b; the casing 1 communicates with a compressed air duct 7, and contains one or more supports 2, 5 which can be adjusted; each support for receiving a filter -F-, to be cleaned, said filter being of any known shape or size; kinematic means 4 are provided for setting into angular motion each support and relative filter while a second jet of compressed air, ejected by a mobile branch of the duct 8 frees the surface not hit by the first jet of air from the particles of dust. The dust removed is directed to a collector 1g connected to a duct in depression which provides for sending the air-dust mixture to known separating means, FIG. 2.

8 Claims, 3 Drawing Sheets

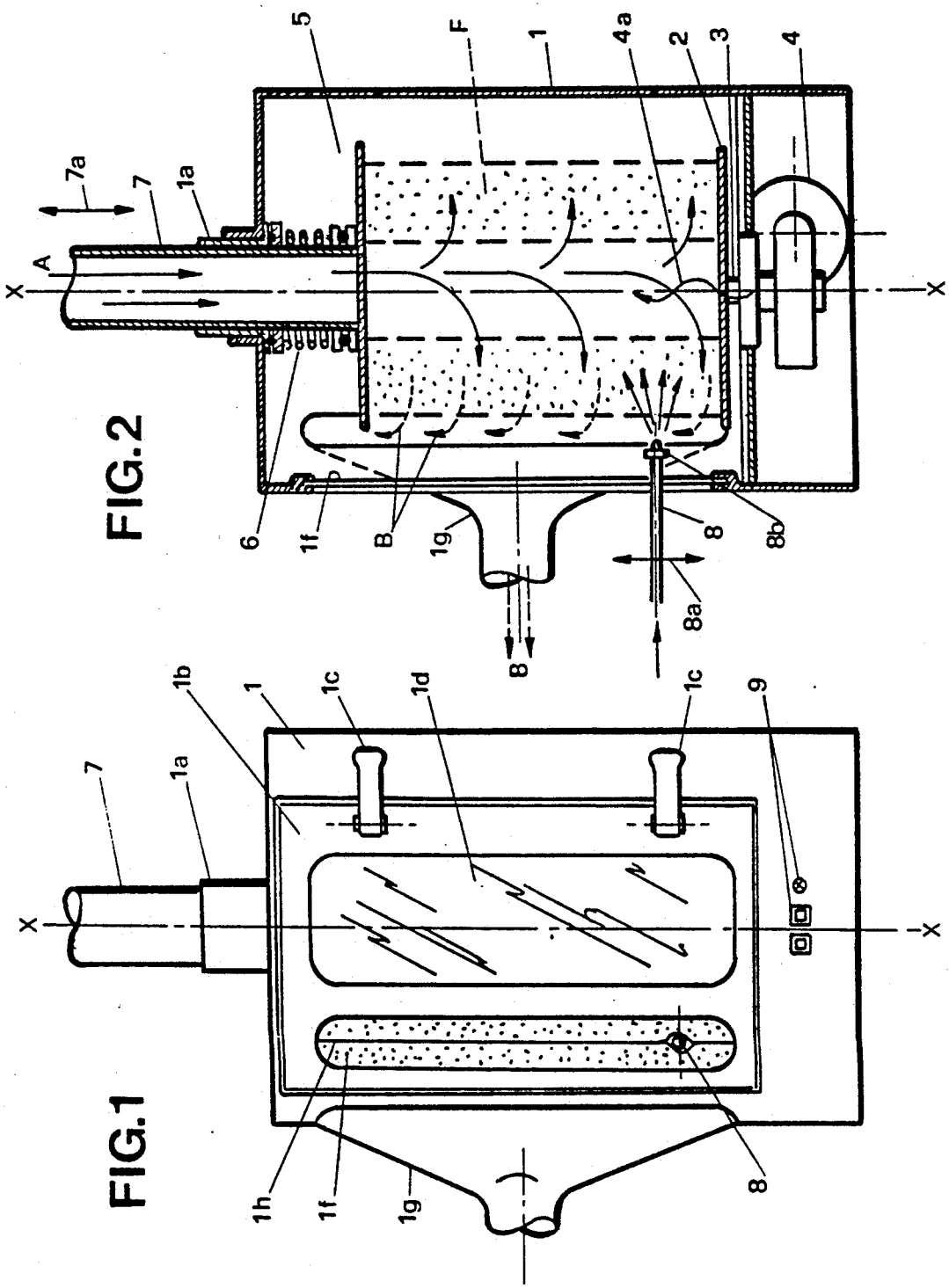

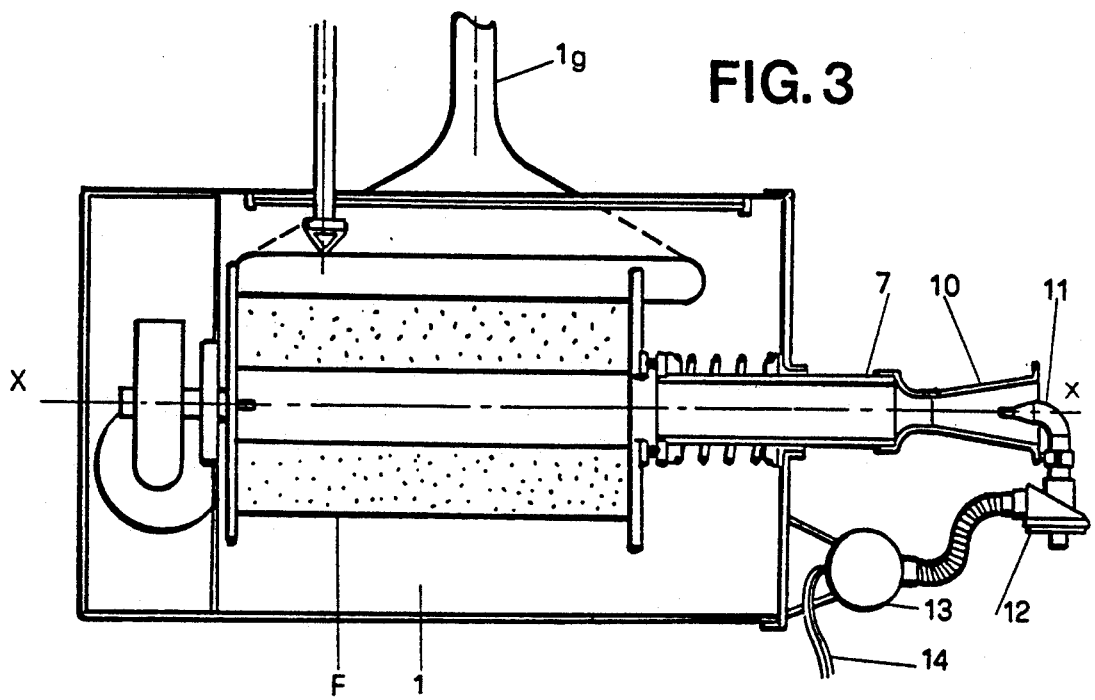
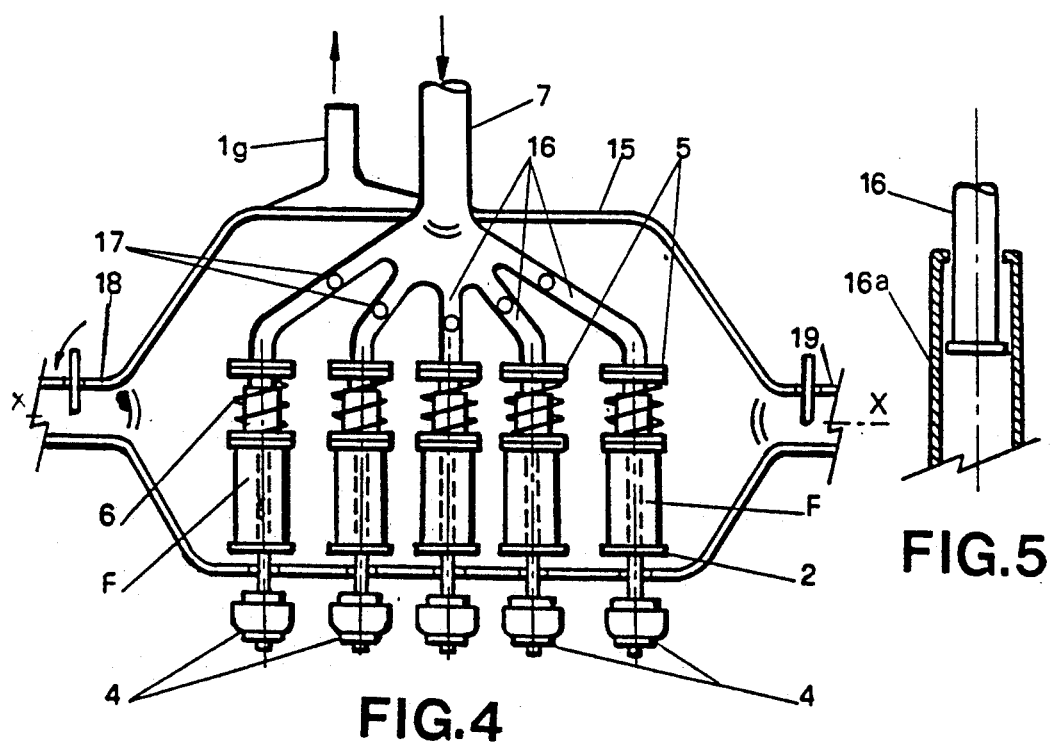

PNEUMATIC DEVICE FOR CLEANING AIR FILTERS

DESCRIPTION

It is known that industrial air filters, and filters for air for combustion, mounted on endothermic engines, particularly engines for motor vehicles, after a certain period of use and in relation to more or less dusty working environments, have to be cleaned or replaced so as to avoid excessive fuel consumption, abnormal running of the engine and a high level of environmental polution.

The frequent replacement of air filters has a notable effect on the running costs of engines, particularly with respect to motor cars, lorries, buses, excavators and the like. The same consideration can be made for filters on stable air conditioners which generally have to be cleaned by means of jets of compressed air in order to remove the dust that has collected on the alveoli. After the filters have been cleaned, they can be used again for a period of time that is obviously shorter than the original period, due to the fact that compressed air jets, orientated at random, do not completely remove the dust, particularly from the accordian type folds that make up the body of the majority of filters and, furthermore, while the majority of the dust removed invades the environment and falls on the operator, a considerable quantity of dust particles, due to the pressure of the air, are pushed downwards into the porous body of the filter, thereby clogging it and reducing airflow, whatever the structure of the filtering body may be.

The purpose of the invention is to provide a pneumatic device which is capable of regenerating the efficiency of the used filters, of any type, and making them suitable for an increased number of cycles of use alternated by cycles of cleaning and, at the same time, avoiding exposure of the operator and the environment to the dust removed, particularly with respect to the periodic cleaning of a considerable number of filters such as, for example, those used in the engines of the numerous motor vehicles making up the fleet for public services and the static motors in large air conditioning plants.

For the above described purpose, the pneumatic device is characterised by the fact that it comprises: a water tight container provided with one or more access doors with controlled closure from the outside; one or more inside mobile supports, one for each filter; said supports being constituted by parallel and coaxial plates of which at least one is axially mobile so as to vary the distance between the axes so as to be able to accept filters of different sizes and shapes; a collector which sucks in the dust removed by the compressed air which is blown into the container through a suitable duct and covers a surface or face of the filter to be cleaned; jets of compressed air emitted by mobile nozzles which hit the surface of the filter(s) opposite the surface hit by the air blown through said duct; a duct which connects the dust sucking collector with known means for separating the air from the dust collected in containers.

The device is described below with reference to the schematic drawings attached as examples.

FIG. 1 is a side view of the device illustrating the access door;

FIG. 2 is a sectional view on a plane passing through axis X—X of FIG. 1, looking in a direction away from the access door;

FIG. 3, is a view similar to FIG. 2, illustrates a variant relative to the input of the compressed air into the container;

Figure 6:
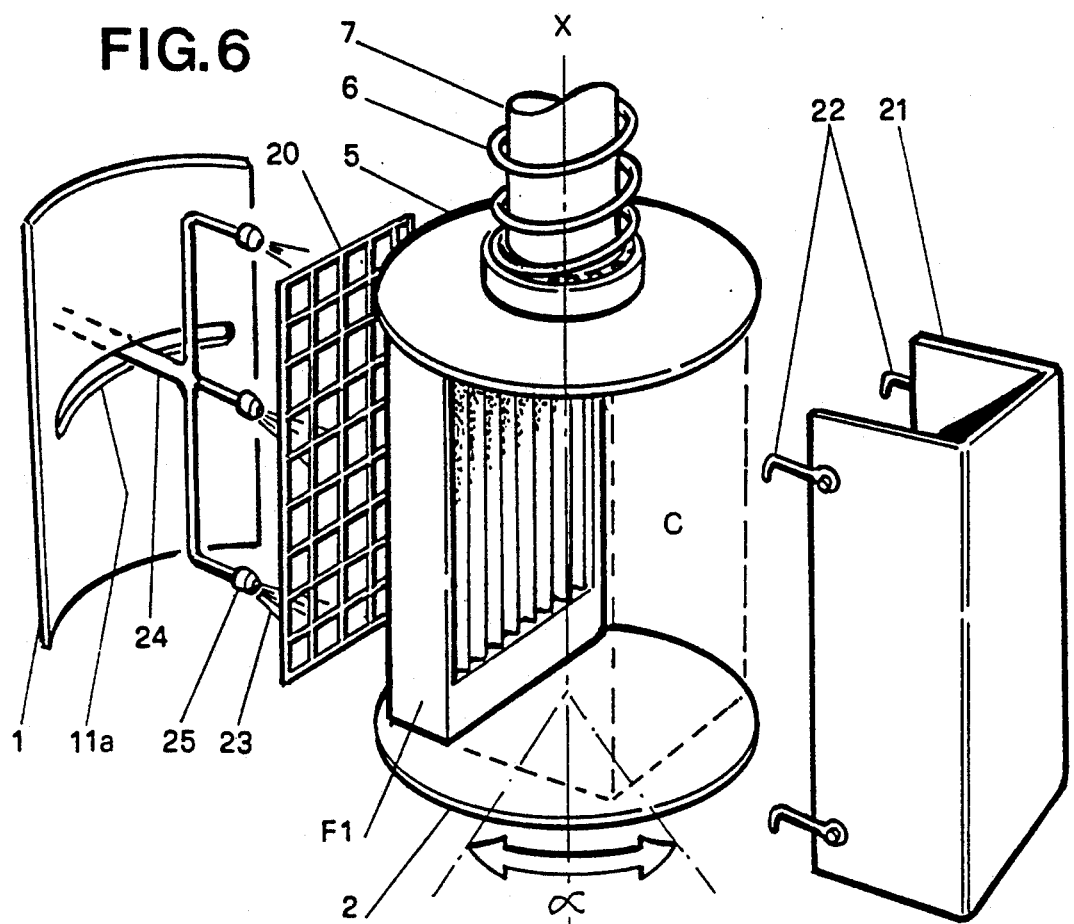
Figure 7:
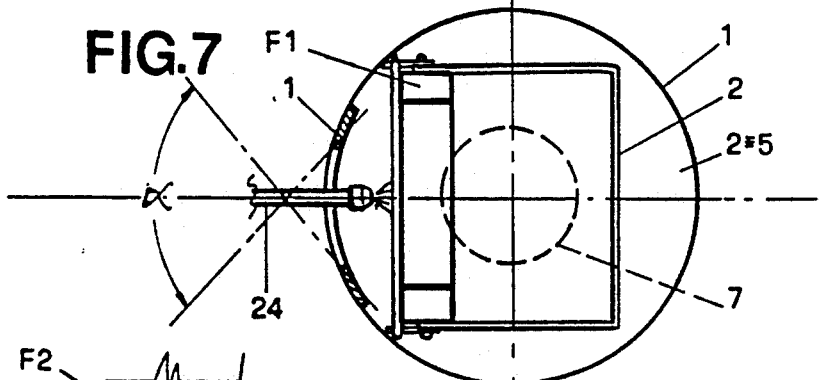
Figure 8:
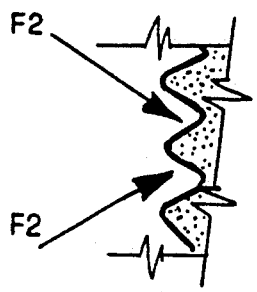

FIG. 4 schematically illustrates a container for the cleaning of a plurality of filters, two, three or more, whose number -n- is variable according to the capacity of the container and of the pneumatic means associated to the plant;

FIG. 5 is an enlarged particular of FIG. 4;

FIG. 6 is an exploded perspective view of a filter cleaning system for cleaning flat illustrates, also in axonometric view, a system and the accessories used for cleaning filters having a shape different from the cylindrical shape, particularly flat filters;

FIG. 7 is a sectional view on a transverse plane of FIG. 6 when assembled for use;

FIG. 8 is an enlarged detail of a common type of filter for motor vehicles.

With reference to FIGS. 1 and 2, 1 indicates a container or casing, in which a support 2 is mounted revolving, as indicated by the arrow 4a, which can be set into angular motion, in both directions, at variable speed, by means of the shaft 3 of a suitable geared motor 4, mounted on the outside of the casing 1, controlled by commutator-switch 9. An annular flange 5 is mounted axially opposite to the support 2, said flange being fixed to a tubular duct 7 slidably mounted, as indicated by the arrow 7a, in a collar 1a, fixed to the casing 1. A spring 6, attached to the tube 7, with the interposition of at least one antifriction means 7b, such as a ball bearing, pushes the flange 5 and the filter -F- against the support 2 (FIG. 2).

1f indicates a longitudinal opening defined by juxtaposed rims fitting into a part 1h in elastically deformable material such as suitably hard rubber or other suitable material; a air supply tube 8 for compressed air -P- and provided with at least one terminal nozzle 8b, passes through said opening; said tubular branch can run, in both directions, through the opening 1f as indicated by the arrow 8a.

1b indicates a water tight door; 1c indicates opening-closing means for said door; 1d indicates a window protected by a fixed and transparent sheet which allows for inspection of the inside of the container 1. The container is provided with a suction collector 1g, associated to known means for the separation of the dust from the air.

The device works as described below: a cylindrical filter -F- to be cleaned is inserted between the support 2 and the flange 5, through the door 1b; the reaction of the spring 6 blocks the filter -F- in the position as shown in FIG. 2.

Compressed air is blown through the duct 7, which hits, from the inside towards the outside, the filter set into angular movement around the axis X—X by the geared motor 4.

Compressed air -P- is blown into the opening 1f with alternate movement through the duct 8, said air coming out of the nozzle 8b and hitting the outside surface of the filter -F- freeing it from the dust and other impurities. The action of the compressed air -A- combined with the action of the compressed air -P- and with the rotating movement of the filter, cleans the body of the same while the dust is directed to the suction collector 1g from which, in the direction -B-, it is sent on to the separating plant. Obviously the two air flows -A- and -P- are separately rated in volume and pressure.

The casing 1 can be advantageously provided with one or more longitudinal and/or transverse openings 1f, and relative ducts for jets of air in order to accelerate the cleaning cycles of the filters. The duct 8, with nozzle 8b, can be set into alternate movement both manually and mechanically by means of the geared motor 4 or other electric or pneumatic means.

With reference to FIG. 3, without altering the working characteristics of the device as described, at the entrance of the duct 7 an ejector 10 is provided said ejector having a nozzle 11 controlled by an electro-valve 12 connected to a tank 13 which, in turn, is connected, in 14, to a suitable air compressor. The electro-valve 12 can be controlled either cyclicly or manually in order to input temporary jets of compressed air which, added to the compressed air already flowing into the filter -F-, generate pneumatic thrusts which can free the filter -F- from all the impurities held in its alveoli.

In FIG. 4, the container indicated by 15 is provided with a duct for the compressed air 7 from which a plurality of branches 16 derive each one being provided with an intercepting valve or electro-valve 17; each duct derived is associated to a support for a filter -F- of the type described and illustrated in FIGS. 2 and 3. Each support can be set into angular motion by a geared motor 4 or by transmission means activated by a single motor. The container 15 can, furthermore, advantageously be provided with supplementary entrances 18, 19 for compressed air. These entrances, normally closed, are opened to let in compressed air, for example at the end of a cleaning cycle of one or more filters and, in particular, for cleaning the container itself.

As illustrated in FIG. 5, to adapt the opposite supports 2 and 5 to the different height of the filters the branches of the duct on which the springs are fitted are telescopic, made up of two branches 16, 16a.

With reference to FIG. 6, for cleaning the filters -F-, which are not cylindrical but substantially flat, said filters are inserted between the supports 2 and 5 together with a grill 20 placed on one face of the filter while a channel member 21 is anyway temporarily fixed to the grill 20, for example by means of hooks 22. In these conditions a chamber -C- is formed, close to the filter, defined by the grill 20, by the part 21, whose transverse profile can anyway be different from that illustrated as an example, and by the support planes 2 and 5; the reaction of the spring 6 blocks the filter into place. For the correct positioning of the filter—orientated on a parallel plane to the axis X—X—and of the parts 20, 21, reference means are provided on the surface of the support 2 or on the surfaces of both the supports 2 and 5. The compressed air blown into -C- passes through the body of the filter and frees it from the dust and any foreign bodies while one or more jets of air 23, disposed in front of the grill 20, remove the dust from the facing surface. The opening 11a and the elastically deformable part 8a are orientated in a transverse direction with respect to the axis X—X. The grill 20 holds the filter and prevents deformation caused by the jet of compressed air arriving from the duct 7. Slow angular alternate motion is advantageously applied to the support 2, for the width of an angle—so as to allow the jet(s) of air emitted from the nozzles 25 to gradually hit all the folded surface of the filter, particularly the single side surfaces -F2-, FIG. 8, of the different folds; the branch of the duct 24 can be oscillated into the transverse opening 11a of the casing 1 and can be set into alternate motion either manually or mechanically.

The device described can advantageously be provided with means for separating the dust and can constitute an autonomous and compact unit.

It is evident from the above that it is advantageous to fit batteries with suitable cells each containing a cleaning device programmed for a specific series of filters; the various cells connected to a single compressed air plant, the whole being able to clean filters of different shapes and sizes, regenerating them. Such apparatus, which can be placed for example in motor vehicle service stations are suitable for the quick cleaning of any type of air filter, mounted on the engine of any motor vehicle, said filter being reactivated at considerably low cost.

I claim:

1. A filter cleaner for reconditioning a filter for reuse, said cleaner comprising:

a casing of a dimension to accommodate the filter to be cleaned;

an air inlet duct mounted to extend slidably through an opening in a wall of said casing;

an annular flange on an end of said inlet duct in said casing;

a spring positioned to bias said flange away from the wall of said casing through which said inlet duct extends;

a support plate dimensioned to engage one edge of the filter to be cleaned, said plate rotatably mounted in said casing at a point spaced from said flange;

an air blowing nozzle movably mounted in said casing for movement between said flange and said support plate; and a suction collector coupled to an opening in a wall of said casing for drawing off air from the interior of said casing, whereby a filter to be cleaned may be spring clamped in said casing between said flange and said support plate so that a cleaning stream of air may be blown over a surface of the filter from said air inlet duct and another air stream may be blown over an opposed surface of the filter by said air blowing nozzle to thereby clean the filter.

2. A filter cleaner as in claim 1 in which said support plate is of a circular configuration dimensioned to engage one end of a cylindrical filter and said air inlet duct is positioned to direct air into the interior of the cylindrical filter.

3. A filter cleaner as in claim 1 in which said air blowing nozzle is supported on an air supply tube mounted for reciprocation in a flexibly gasketed slot in said casing.

4. A filter cleaner as in claim 1, in which a shaft extends from said support plate through a wall of said container; and a motor is coupled to said shaft to rotate said support plate.

5. A filter cleaner as in claim 1 in which a compressed air ejector is positioned in said air inlet duct; and a valve is coupled to said ejector to provide intermittent thrusts of air therethrough.

6. A filter cleaner as in claim 1 in which a channel member is removably positioned between said support and said flange, with said channel oriented to provide an air path from said air inlet duct in said container; and a grill positioned between said support and said flange, with a flat filter to be cleaned sandwichable between said channel member and said grill so that air flowing from said inlet duct through said channel member will pass through the filter.

7. A filter cleaner as in claim 1 in which a plurality of air distributing branches extend from said air inlet duct, and each of said branches is formed with an annular flange spaced from a separate support plate, whereby a plurality of filters may be simultaneously cleaned.

8. A filter cleaner as in claim 7, in which each of said branches is formed of telescopic tubing which may be extended or retracted to accommodate filters of different sizes between the flange and the support plate associated with the branch.

* * * * *